Dec. 12, 1944.　　　　　　R. J. WRAY　　　　　　2,364,887
PLOW
Filed May 5, 1943　　　　　2 Sheets-Sheet 1

Inventor
Robert J. Wray

By Webster & Webster
Attorney

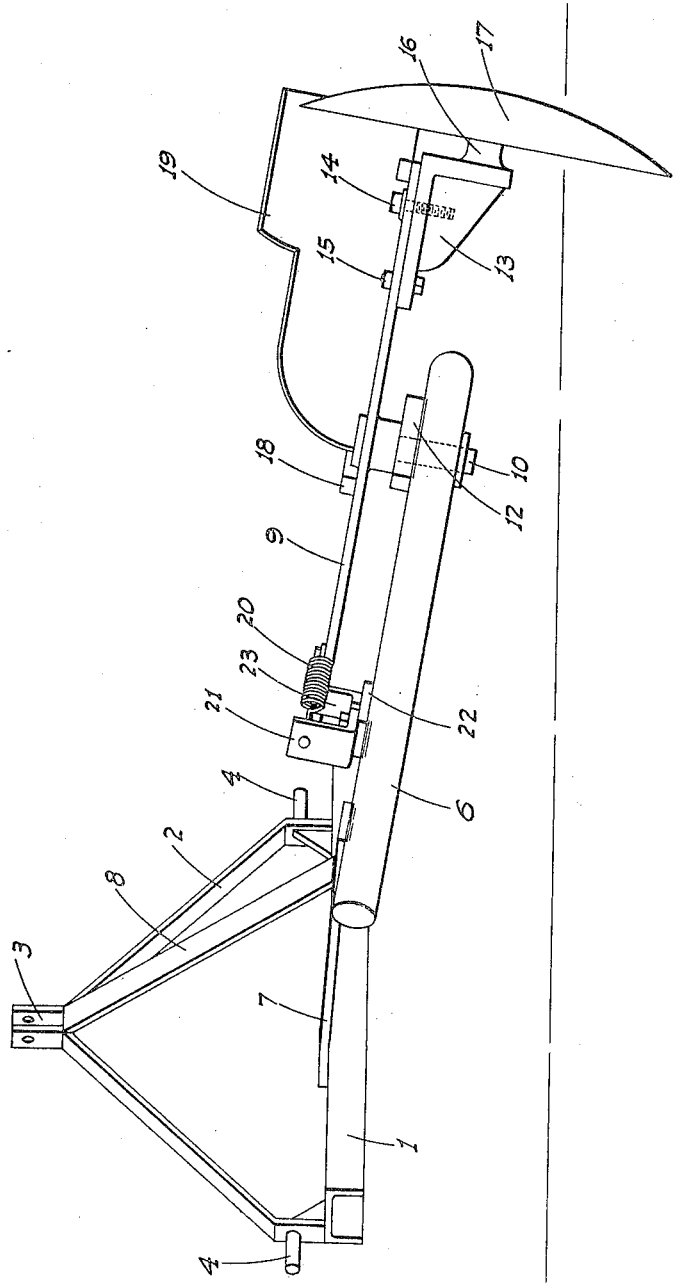

Patented Dec. 12, 1944

2,364,887

UNITED STATES PATENT OFFICE 2,364,887

PLOW

Robert J. Wray, Modesto, Calif.

Application May 5, 1943, Serial No. 485,742

9 Claims. (Cl. 97—137)

This invention relates to plows for vineyard use, and particularly to a plow of this general type adapted to cultivate close to the trunks of the vines.

One object of the invention is to provide a plow for the purpose so constructed that the plow element will be automatically deflected laterally relative to the line of draft from actual contact with any trunk as the plow moves along a row of vines, allowing of the dirt to be cultivated close to the vines as is desirable.

Another object is to mount the plow element so that its resistance to being thus deflected may be readily altered to suit different operations conditions.

A further object is to mount the plow as a whole in connection with a draft tractor in such a manner that if for some reason the plow element is not automatically deflected sufficient to miss a vine trunk, the entire plow structure will then deflect laterally relative to the line of draft but will reassume its normal position as soon as the trunk is cleared.

The plow structure includes a plowing disc, which to function is necessarily set at an angle to the line of draft.

Still another object of the invention is to mount the disc so that its angle may be changed as operating conditions may render advisable without affecting the operation of the automatic deflecting feature.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a side elevation of the plow, detached from the tractor, and looking at a forward angle.

Figure 1:
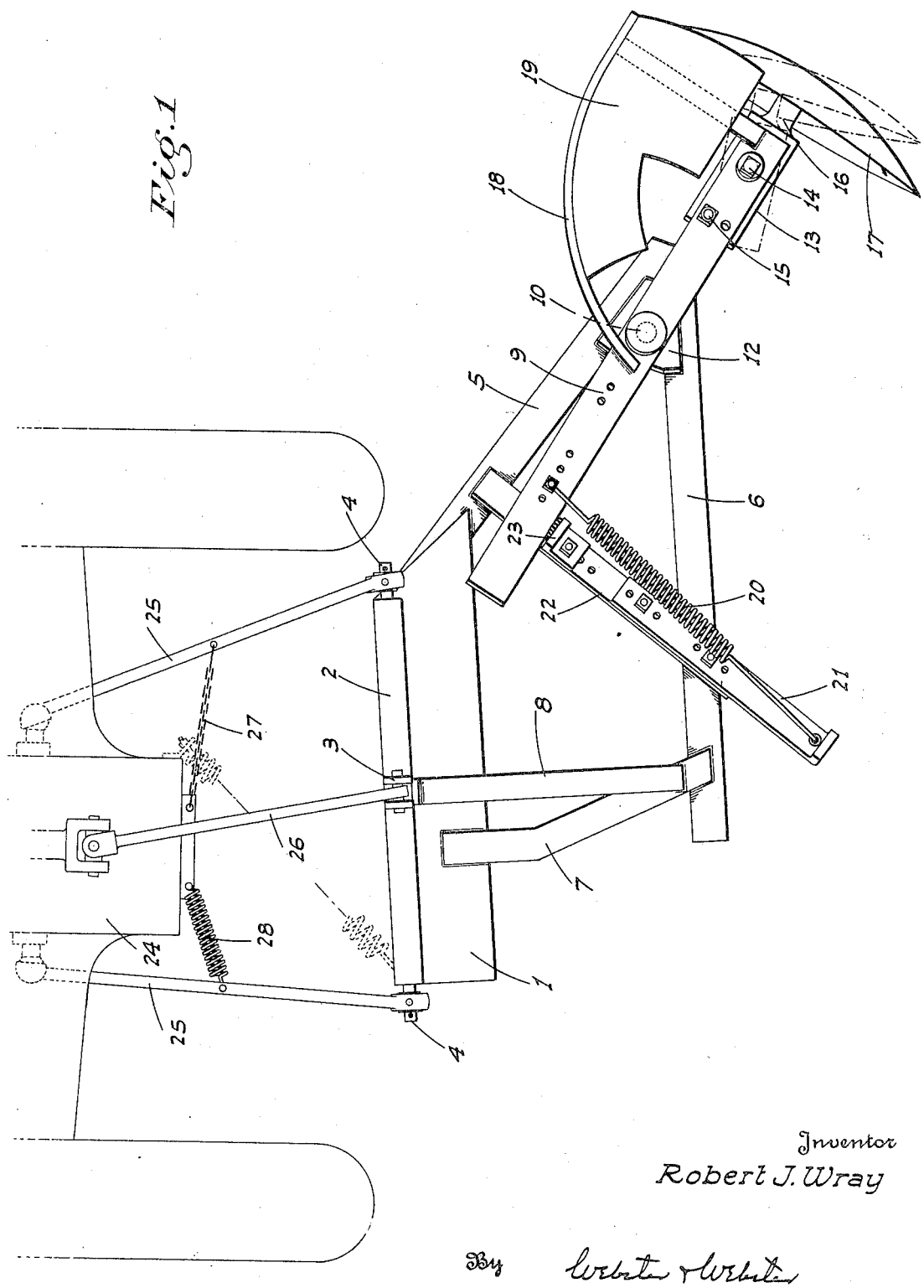
Figure 1 is a plan view of my improved plow as attached to a tractor.

Referring now more particularly to the characters of reference on the drawings, the frame of the plow structure comprises a front cross beam 1 having an upstanding A-unit rigid therewith and provided at its upper end with a clevis 3. Trunnions 4 project from the opposite sides of the A-unit adjacent its lower end. The clevis and trunnions serve as a means for attachment to a draft tractor, as will be hereinafter seen.

Fixed rigid with the beam 1 at one end and projecting rearwardly at a downward slope and in laterally diverging relation to the line of draft in a direction toward the row of vines being cultivated is another beam 5. This beam is maintained in non-yielding relation with the beam 1 by a rear cross bar 6 parallel to said beam 1; brace straps 7 and 8 projecting forwardly from the bar 6 and connected with the beam 1 and unit 2 respectively. The beams 15 and crossbar 6 thus form a rigid unit, and constitute the frame structure of the device.

A plow beam 9, generally parallel to the beam 5, is disposed above the same and is pivotally supported intermediate its ends from the frame structure for swinging movement in a generally horizontal plane by a king-pin 10. This king-pin is turnable in a bearing 12 fixed on the frame in the corner between the beam 5 and the bar 6; the beam 9 thus projecting rearwardly of the frame structure.

A bracket 13 is disposed directly under the beam 9 at its rear end and is pivotally secured therewith by a bolt 14; turning of the bracket being normally prevented by another bolt 15 adjustably connecting the bracket and said beam ahead of the bolt 14. A spindle 16 projects rearwardly from the bracket and supports a turnable plowing disc 17 of conventional character; which while substantially at right angles to the beam 9 is also disposed at a forward diverging angle to the line of draft and to one side of the front cross beam 1.

A substantially horizontal curved deflector rail 18 is rigidly fixed in connection with the beam 9 and extends from in front of the disc to a termination at the beam adjacent the king-pin 10; a guard plate 19 extending upwardly over from said rail and curving over the adjacent upper portion of the disc.

A tension spring 20 connects at one end with the beam 9 ahead of the pivot 10, and at the other end is connected to a supporting strap 21 which is mounted for longitudinal adjustment in a direction substantially at right angles to the beam 9, on a diagonal brace 22 extending between the beam 5 and bar 6. The pulling action of the spring on the beam 9 tending to swing the rear portion of the beam forwardly, is limited by the engagement of said beam with a stop 23 mounted on the brace 22 for adjustment along the same.

From the above description it will be seen that if the frame is being pulled forwardly in a line substantially at right angles to the cross beam 1 and the disc is operating in the path of a trunk of a vine, such trunk will be engaged by the rail 18 and the beam 9 will be swung back, so as to deflect the disc 17 clear of the vine and avoid damaging contact of the disc with the vine and adjacent roots. The spring is then placed under increased tension so that the beam 9 will be returned to its original position as soon as the rail clears the vine. The normal tension of the spring may be altered by altering the setting of the support 21 on the brace 22, while the working angle of the disc may be altered by changing the position of the stop 23, or to a greater extent by changing the position of the bracket 13 relative to the beam 9.

In addition, the plow structure can swing laterally relative to the draft tractor 24, in the event that the swing of the beam 9 does not result in disc clearance, by reason of the following draft connection:

The trunnions 4 are connected to the tractor by transversely spaced laterally swingable draft arms 25, the clevis 3 being also connected to the tractor at a higher level by a centrally disposed laterally swingable arm 26 or the like. The angle of draft of the plow disc naturally tends to cause the plow structure as a whole to shift toward the corresponding side, such shifting being limited by a flexible tension element such as a chain 27 connected between the arm 25 on said side and a rigid member of the tractor. A tension spring 28 connects the other arm 25 and the tractor and acts to hold said chain taut and the plow structure shifted toward the corresponding side of the tractor. If, however, the rail 18 when deflected as far as the movement of the beam 9 will allow, fails to clear a vine, the chain 27 slackens and the spring 28 is tensioned. This allows the plow structure to shift bodily, while at the same time the spring exerts a pull on the plow structure to restore it to its original position once the obstruction is cleared.

If a stronger or longer spring is required, such a spring may extend diagonally between the tractor on one side and the front end portion of the plow frame on the opposite side, as indicated in Fig. 1.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A vineyard plow comprising a frame adapted for movement along the ground in a substantially straight draft line, a plow beam mounted on the frame for swinging movement in a substantially horizontal plane and projecting beyond the rear end and one side thereof, said beam being disposed in rearwardly diverging relation to said draft line, a plow element supported from the beam adjacent its rear end and disposed in forwardly diverging relation to said line, means acting on the beam to resist swinging movement thereof in a direction to shift the rear end thereof transversely and toward the opposite side of the frame and means to alter the normal angle of divergence of the plow beam whereby to alter the angle of the plow element relative to the line of draft.

2. A vineyard plow comprising a frame adapted for movement along the ground in a substantially straight draft line a plow beam mounted on the frame for swinging movement in a substantially horizontal plane and projecting beyond the rear end and one side thereof, said beam being disposed in rearwardly diverging relation to said draft line, a plow disc supported from the beam adjacent its rear end and disposed in forwardly diverging relation to said line, means acting on the beam to resist swinging movement thereof in a direction to shift the rear end thereof transversely and toward the opposite side of the frame, a deflector rail secured on the beam and extending in front of the disc and a guard plate projecting upwardly from the rail and over the upper forward portion of the disc.

3. A vineyard plow comprising a frame adapted for movement along the ground in a substantially straight draft line, a plow beam vertically spaced from the frame and projecting beyond one side of the same, means pivotally mounting the beam intermediate its ends on the frame, a plow disc supported from the rear end of the beam and disposed at a forwardly diverging angle to the line of draft, a tension spring extending rearwardly from and secured at one end on the beam ahead of its pivot, a support for the rear end of the spring and means mounting the support on the frame for adjustment in a direction lengthwise of the spring.

4. A structure as in claim 3, with an adjustable stop mounted in connection with the frame and engaged by the beam to limit movement of the latter in the direction of pull of the spring.

5. In the combination of a tractor and a vineyard plow, the tractor having transversely spaced draft arms swingable laterally through a limited arc and the plow including a frame to which the arms at their rear end are connected, and a plow disc supported from the frame for yieldably resisted lateral movement toward one side of the tractor and disposed on the other side of the tractor at a forwardly diverging angle whereby upon forward movement of the tractor the frame will tend to shift toward said other side; and a spring between one draft arm and the tractor acting to yieldably resist movement of said arm and the frame toward said one side of the tractor.

6. In the combination of a tractor and a vineyard plow, the tractor having transversely spaced draft arms swingable laterally through a limited arc and the plow including a frame to which the arms at their rear end are connected, and a plow disc supported from the frame and disposed to one side of the tractor at a forwardly diverging angle whereby upon forward movement of the tractor the frame will tend to shift toward said side; and means actuated by an obstruction in the path of the disc to shift the same laterally toward the opposite side of the tractor; and a spring between one draft arm and the tractor acting to yieldably resist movement of said arm and the frame toward said opposite side of the tractor while allowing of such movement of the frame if said means fails to clear the obstruction.

7. In the combination of a tractor and a vineyard plow, having connecting draft means to allow limited lateral movement of the plow relative to the tractor; the plow including a frame and a plow disc supported therefrom for yieldably resisted lateral movement toward one side of the tractor and disposed on the other side of the tractor at an angle to the line of draft, such that upon forward movement of the tractor the frame will tend to shift toward said other side and a spring mounted on the tractor and acting on the frame to yieldably resist lateral movement thereof toward said one side of the tractor independent of lateral movement of the disc relative to the frame.

8. A structure as in claim 1, with means mounting the plow element on the beam for swinging movement relative thereto to independently alter the angle of divergence of said element.

9. A vineyard plow comprising a frame adapted for movement along a predetermined line of draft, a plow beam mounted on the frame for swinging movement in a substantially horizontal plane and projecting beyond the rear end and one side thereof, said beam being disposed in rearwardly diverging relation to said line of draft, a plow element supported from the beam adjacent its rear end and disposed in forwardly diverging relation to said line, means to alter the normal angle of divergence of the plow beam whereby to alter the angle of the disc relative to the line of draft and comprising a bracket secured in connection with the beam adjacent its rear end for adjustable swinging movement in a substantially horizontal plane, and a plow element supporting spindle rigid with and projecting rearwardly from the bracket.

ROBERT J. WRAY.